No. 777,044. PATENTED DEC. 6, 1904.
J. F. McWILLIAM.
REEL FOR ADHESIVE PLASTER.
APPLICATION FILED SEPT. 5, 1902. RENEWED APR. 4, 1904.
NO MODEL.
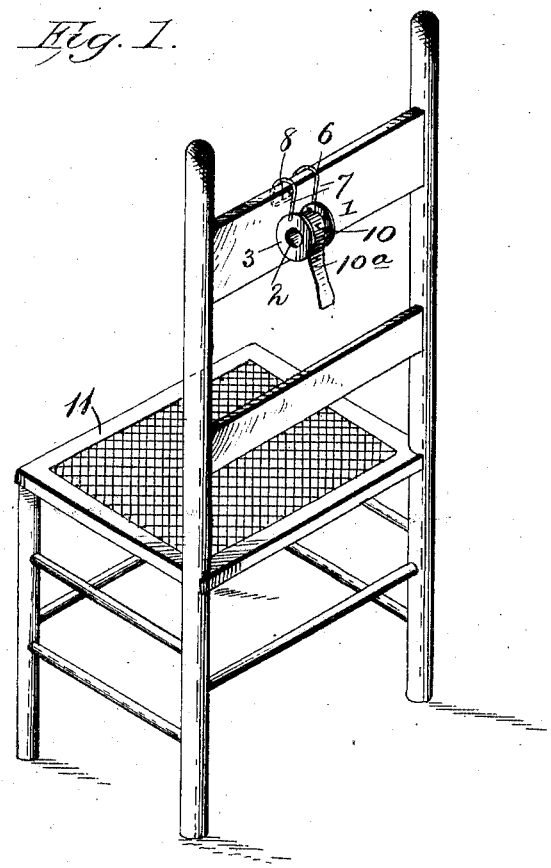
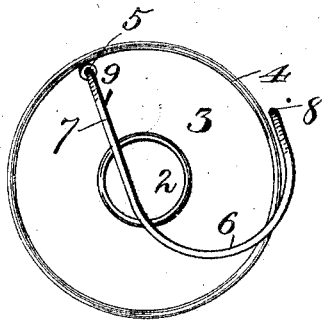 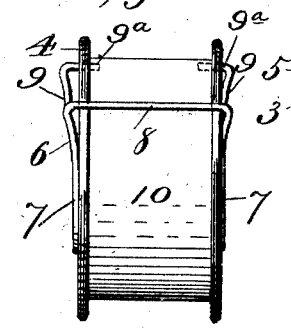 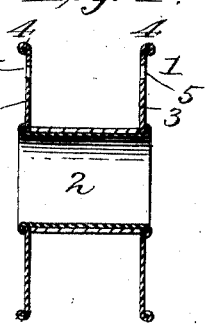

No. 777,044. Patented December 6, 1904.

UNITED STATES PATENT OFFICE.

JOHN F. McWILLIAM, OF SOMERVILLE, NEW JERSEY.

REEL FOR ADHESIVE PLASTER.

SPECIFICATION forming part of Letters Patent No. 777,044, dated December 6, 1904.

Application filed September 5, 1902. Renewed April 4, 1904. Serial No. 201,596. (No model.)

*To all whom it may concern:*

Be it known that I, JOHN F. McWILLIAM, a citizen of the United States, residing at Somerville, in the county of Somerset and State of New Jersey, have invented new and useful Improvements in Reels for Adhesive Plaster, of which the following is a specification.

My invention relates to reels for adhesive plaster; and the object of the same is to construct a device of this character which can be hung on the back of a chair or bed and as much adhesive plaster as desired unwound, after which it can be detached and folded up compactly.

The simple and novel construction employed by me in carrying out my invention is fully described and claimed in this specification and illustrated in the accompanying drawings, forming a part thereof, in which—

Figure 1 is a perspective view of my reel hung on a chair. Fig. 2 is an end elevation of the reel folded up. Fig. 3 is an edge view of the same, and Fig. 4 is a section of the spool.

Like numerals of reference designate like parts in the different views of the drawings.

The numeral 1 designates a spool having a hollow hub 2 and heads 3. The rims 4 of the heads 3 are turned over to strengthen them, and apertures 5 are formed therein and located opposite to each other. A suspension member 6 is connected to the reel 1 and comprises two parallel hooked members 7, connected at their outer hooked ends by a cross-bar 8 and having shanks 9, the ends $9^a$ of which are turned inwardly at right angles to engage the apertures 5. The reel 1 carries a supply of adhesive plaster 10.

In using my reel the suspension member is engaged on some support, such as the back of a chair 11, as shown in Fig. 1, and the end $10^a$ of the adhesive plaster grasped and unrolled. When enough plaster has been unwound, the hook 6 is detached and folded up, as shown in Fig. 2, with the spool 1 fitting snugly between the members 7, thereby making a very compact structure. The members 7 are sprung toward each other slightly to engage the heads of the spool and prevent the member 6 from becoming accidentally disengaged from the spool.

I do not wish to be limited as to details of construction, as these may be varied in many particulars without departing from the spirit of my invention.

Having described my invention, what I claim as new, and desire to secure by Letters Patent, is—

1. In a reel, the combination of a spool, a suspension member pivoted to said spool and comprising two hooked sides connected at their outer ends by a cross-bar, said suspension member being adapted to be folded up to fit over the ends of said spool, substantially as described.

2. In a reel, the combination of a spool having apertures therein near the rim of the heads, and a suspension member having parallel hooked sides connected at their hooked ends by a cross-bar and pivoted at their other ends to said apertures, substantially as described.

In testimony whereof I have hereunto set my hand in presence of two subscribing witnesses.

JOHN F. McWILLIAM.

Witnesses:
WILLIAM W. BROKAW,
SAMUEL P. SUTPHEN.